(12) United States Patent
Kang et al.

(10) Patent No.: US 9,401,800 B1
(45) Date of Patent: Jul. 26, 2016

(54) CLOCK DATA RECOVERY SYSTEM FOR SERDES

(71) Applicants: GLOBAL UNICHIP CORPORATION, Hsinchu (TW); TAIWAN SEMICONDUCTOR MANUFACTURING CO., LTD., Hsin-Chu (TW)

(72) Inventors: Wen-Juh Kang, Hsinchu (TW); Yen-Chung Tony Chen, Santa Clara, CA (US); Chen-Yang Pan, Hsinchu (TW)

(73) Assignees: GLOBAL UNICHIP CORPORATION, Hsinchu (TW); TAIWAN SEMICONDUCTOR MANUFACTURING CO., LTD., Hsin-Chu (TW)

( * ) Notice: Subject to any disclaimer, the term of this patent is extended or adjusted under 35 U.S.C. 154(b) by 61 days.

(21) Appl. No.: 14/798,605

(22) Filed: Jul. 14, 2015

(51) Int. Cl.
| | |
|---|---|
| *H04L 7/04* | (2006.01) |
| *H04L 7/00* | (2006.01) |
| H04L 25/03 | (2006.01) |
| H04N 5/44 | (2011.01) |
| H04N 21/438 | (2011.01) |

(52) U.S. Cl.
CPC .............. *H04L 7/0062* (2013.01); *H04L 7/048* (2013.01); *H04L 25/03019* (2013.01); *H04L 2025/0349* (2013.01); *H04N 5/4401* (2013.01); *H04N 21/4382* (2013.01)

(58) Field of Classification Search
CPC ................. H04L 2025/0349; H04L 25/03019; H04N 21/4382; H04N 5/4401
See application file for complete search history.

(56) References Cited

U.S. PATENT DOCUMENTS

| 9,148,235 | B1* | 9/2015 | Kang ................... H04B 17/104 |
| 2005/0185742 | A1* | 8/2005 | Liu ......................... H04L 7/007 |
| | | | 375/348 |
| 2007/0280343 | A1 | 12/2007 | Bau et al. |
| 2008/0165841 | A1* | 7/2008 | Wall ......................... H03L 7/08 |
| | | | 375/232 |
| 2011/0274154 | A1 | 11/2011 | Aziz et al. |
| 2012/0155530 | A1 | 6/2012 | Zhong |
| 2012/0257652 | A1 | 10/2012 | Malipatil et al. |
| 2015/0117579 | A1* | 4/2015 | Shibasaki ............. H04L 7/0058 |
| | | | 375/355 |

* cited by examiner

*Primary Examiner* — Ross Varndell
(74) *Attorney, Agent, or Firm* — WPAT, P.C.; Justin King

(57) ABSTRACT

A clock data recovery system is provided. A CTLE generates a first equalized signal. An adder superposes the first equalized signal and a feedback equalization signal and generates a superposed signal. A first error slicer slices the superposed signal according to a clock signal and a reference voltage and generates a first error signal. A second error slicer slices the superposed signal according to the clock signal and a second slicing voltage. A data slicer slices the superposed signal according to the clock signal and a third slicing voltage and generates a data signal. A CDR circuit generates the clock signal. An adaptive filter receives the data signal and the first error signal, and generates the reference voltage and a DFE coefficient set. A DFE receives the data signal and the DFE coefficient set, and generates the feedback equalization signal.

9 Claims, 7 Drawing Sheets

CLOCK DATA RECOVERY SYSTEM FOR SERDES

FIELD OF THE INVENTION

The present invention relates to a circuit of a serializer/deserializer (also referred as Serdes), and more particularly to a clock data recovery system for a Serdes.

BACKGROUND OF THE INVENTION

An electrical circuit (e.g., chip, die, integrated circuit, etc.) is one of the most essential hardware foundations of modern information society. Different electrical circuits can be connected into an interconnection system by channel(s), so these electrical circuits can exchange signals (e.g., information, data, messages, commands and/or packages) to coordinate and cooperate with each other for implementing integrated macro functions. However, the characteristics of the channel will impact the quality of signal exchange. Generally, the channel is of low-pass nature, and therefore will suppress high-frequency portion of the signal and cause signal distortion. For example, when an electrical circuit acts as a transmitter and transmits a signal of a square waveform to another electrical circuit which acts as a receiver, the receiver will receive a slowly rising and falling waveform, instead of a square waveform with sharp rising and falling edges. In the waveform received by the receiver, the slowly rising portion is referred to as a pre-cursor, the peak of slowly rising forms a main cursor, and the slowly falling portion after the peak is referred to as a post-cursor. Signal distortion will cause inter-symbol interference (ISI) and degrade the quality of signal transmission, e.g., increase bit error rate.

To compensate the impact of the channel, the transmitter and the receiver are respectively equipped with filtering and equalization mechanisms. For example, the filtering mechanism of the transmitter (Tx) can include a pre-emphasis filter for emphasizing the high-frequency portion of the signal of the transmitter, and the equalization mechanism of receiver (Rx) can include a CTLE (continuous time linear equalizer) and a DFE (decision feedback equalizer). When a transmitter intends to send a signal to a receiver, the filter of the transmitter will filter the outgoing signal based on a plurality of filter taps, so the filtered signal can be driven to a channel. When the receiver receives the incoming signal from the channel, the receiver will equalize the received signal based on a plurality of equalizer taps, and then retrieve the contents and/or other information (e.g., clock) from the equalized signal.

FIG. 1 is a schematic circuit diagram illustrating a conventional Serdes. In the electrical circuit of a transmitter (Tx), a pre-emphasis filter receives a data signal S and generates a filtered data signal Sw. In particular, the pre-emphasis filter 102 increases the magnitude of the high-frequency portion of the data signal S and thus generates the filtered data signal Sw.

After the filtered data signal Sw is transmitted from a first end of a channel 104 to a second end of the channel 104, the filtered data signal Sw is turned into a received signal Sx and inputted into the electrical circuit of a receiver Rx. In the electrical circuit of the receiver Rx, a clock data recovering system 110 is used to reconstruct the data signal S.

The clock data recovering system 110 comprises a data sampler 113, an edge sampler 115, a clock data recovering circuit 117, a decision feedback equalizer 119 and an adder 111.

Generally, the received signal Sx from the second end of the channel 104 is inputted into the clock data recovering system 110. By the adder 111, a feedback equalization signal Sf from the decision feedback equalizer 119 and the received signal Sx are superposed with each other to generate a superposed signal Sz.

The data sampler 113 samples the superposed signal Sz according to a data clock dCLK and thus generates a sampled data signal Sd. Moreover, the edge sampler 115 samples the superposed signal Sz according to an edge clock eCLK and thus generates a sampled edge signal Sedg.

The clock data recovering circuit 117 receives the sampled data signal Sd and the sampled edge signal Sedg and thus generates the data clock dCLK and the edge clock eCLK. The decision feedback equalizer 119 receives the sampled data signal Sd and thus generates the feedback equalization signal Sf.

As mentioned above, the clock data recovering system 110 is used for sampling the data and the data edge of the superposed signal Sz and generating the data clock dCLK and the edge clock eCLK by using the clock data recovering circuit 117. In this kind of clock data recovering system 110, the clock data recovering circuit 117 has to generate the data clock dCLK and the edge clock eCLK at double data rate in order to over-sample the superposed signal Sz. Moreover, the phase difference between the data clock dCLK and the edge clock eCLK is 180 degrees.

In particular, the clock data recovering circuit 117 further comprises a bang-bang phase detector for receiving the sampled data signal Sd and the sampled edge signal Sedg and generating a phase update information. According to the phase update information, the phases of the data clock dCLK and the edge clock eCLK are correspondingly adjusted.

Obviously, the conventional Serdes is not suitably applied to a high speed data transmission system. For example, if the data rate of the data signal S is 16 Gbps, it is necessary for the clock data recovering circuit 117 to generate the data clock dCLK and the edge clock eCLK at double data rate (e.g. 32 GHz) in order to reconstruct the data signal S.

SUMMARY OF THE INVENTION

An embodiment of the present invention provides a clock data recovery system. The clock data recovery system includes a continuous time linear equalizer, an adder, a first error slicer, a second error slicer, a data slicer, a clock data recovery circuit, an adaptive filter and a decision feedback equalizer. The continuous time linear equalizer receives a received signal and generates a first equalized signal. The adder is used for superposing the first equalized signal and a feedback equalization signal with each other, thereby generating a superposed signal. The first error slicer is used for slicing the superposed signal according to a clock signal and a first slicing voltage, thereby generating a first error signal. The second error slicer is used for slicing the superposed signal according to the clock signal and a second slicing voltage, thereby generating a second error signal. The data slicer is used for slicing the superposed signal according to the clock signal and a third slicing voltage, thereby generating a data signal. The clock data recovery circuit receives the data signal and the second error signal, and generates the clock signal to the data slicer, the first error slicer and the second error slicer. The adaptive filter receives the data signal and the first error signal, and generates a reference voltage to the first error slicer and generates a decision feedback equalizer coefficient set, wherein the reference voltage is equal to the first slicing voltage. The decision feedback equalizer receives the data signal and the decision feedback equalizer coefficient set, and generates the feedback equalization signal to the adder.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
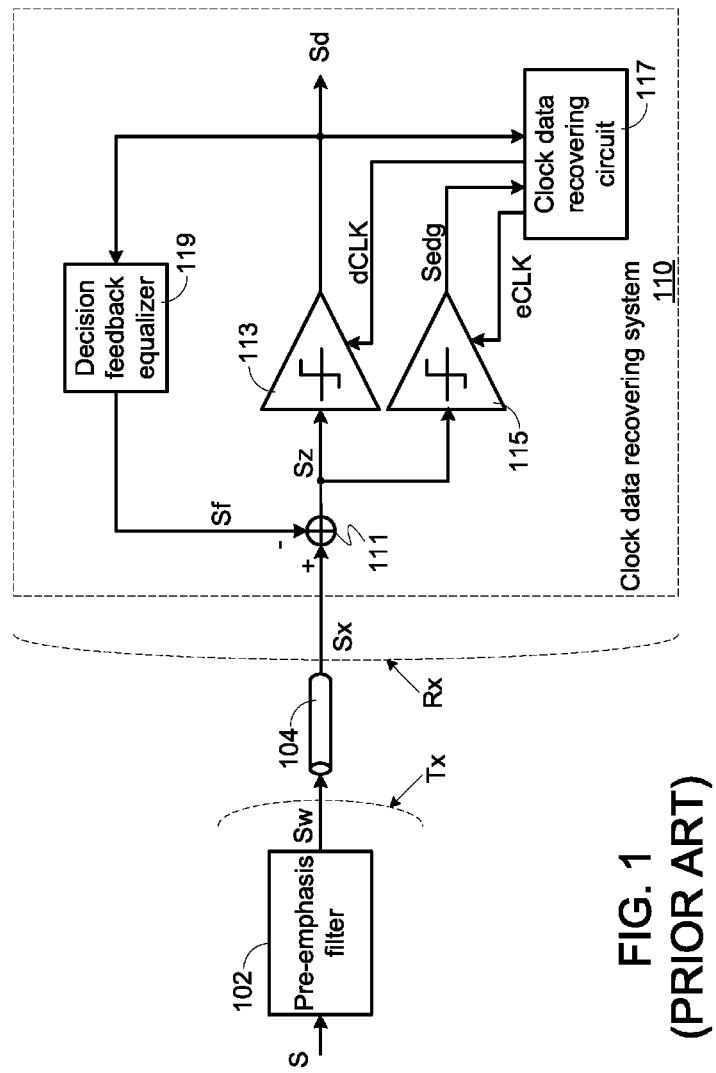
FIG. 1 (prior art) is a schematic circuit diagram illustrating a conventional Serdes.
Figure 2:
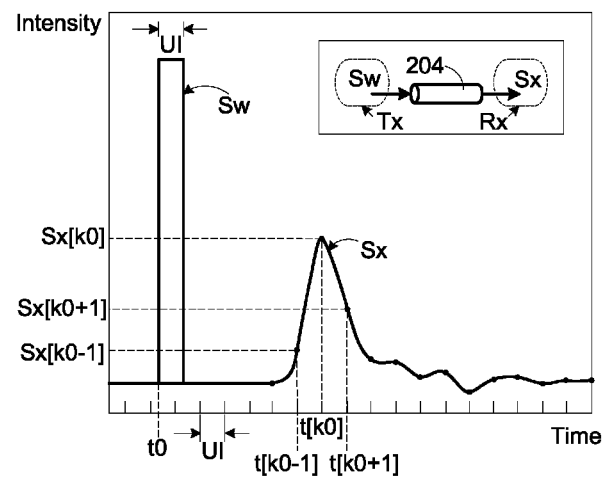
FIG. 2 schematically illustrates the channel impact on the signal transmission.

FIG. 2 schematically illustrates the channel impact on the signal transmission. As shown in FIG. 2, a transmitter Tx is connected with a receiver Rx via a channel 204. When the transmitter Tx intends to send a filtered data signal Sw to the receiver Rx, a filtered data signal Sw propagates through the channel 204 to form a received signal Sx. Consequently, the received signal Sx is received by the receiver Rx. In the example of FIG. 2, the filtered data signal Sw carries a logic 1 symbol with a square wave staring at the time point t0 and lasting for an interval UI. Due to waveform distortion caused by the channel 204, the square wave in the filtered data signal Sw becomes a slowly rising and falling waveform in the received signal Sx. As the receiver Rx samples the received signal Sx, the logic 1 symbol corresponds to a peak sample Sx[k0] forming a main cursor at the time point t[k0]. The portion of the received signal Sx before the time point t[k0] forms a pre-cursor such as a sample Sx[k0−1] at the time point t[k0−1]. The portion of the received signal Sx after the time point t[k0] forms a post-cursor such as a sample Sx[k0+1] at the time point t[k0+1]. The interval between every two consecutive ones of the time points t[k0−1], t[k0] and t[k0+1] may be equal to the interval UI.

Under an ideal circumstance, the intensity of the pre-cursor and the intensity of the post-cursor should be equal to zero, and only main cursor is left. However, owing to the non-ideal influence caused by channel characteristics, the received signal Sx will suffer pre-cursor and the post-cursor with certain intensities, and hence induce the inter-symbol interference (ISI).

Figure 3:
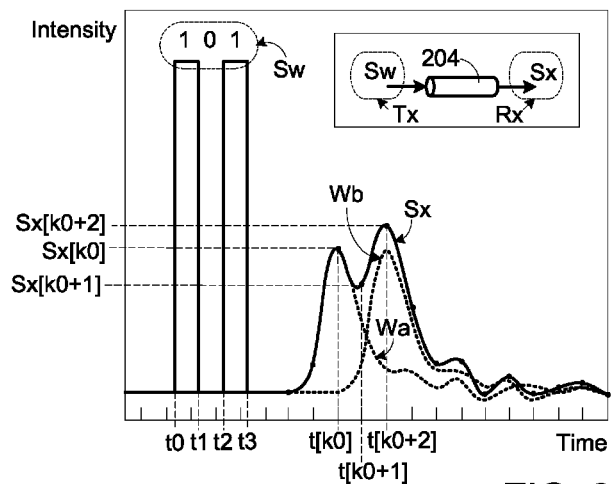
FIG. 3 schematically illustrates the inter-symbol interference in the received signal.

Following FIG. 2, please refer to FIG. 3. FIG. 3 schematically illustrates the inter-symbol interference in the received signal. As shown in FIG. 3, the filtered data signal Sw carries three consecutive symbols from the time point t0 to the time point t3, respectively. The three consecutive symbols include a logic 1 symbol, a logic 0 symbol and a logic 1 symbol. Due to waveform distortion caused by the channel 204, the square wave of the logic 1 symbol between the time point t0 and the time point 1 forms a waveform Wa in the receiver Rx, and the logic 1 symbol between the time point t2 and the time point t3 forms a waveform Wb in the receiver Rx. The received signal Sx in the receiver Rx is a combination of the waveforms Wa and Wb. The logic 1 symbol, the logic 0 symbol and the logic 1 symbol in the filtered data signal Sw correspond to the samples Sx[k0], Sx[k0+1] and Sx[k0+2] of the received signal Sx, respectively.

Please refer to FIG. 3 again. Similarly, the portion of the waveform Wa of the received signal Sx after the time point t[k0] forms a post-cursor, and the portion of the waveform Wb of the received signal Sx before the time point t[k0+2] forms a pre-cursor. Since the post-cursor of the waveform Wa and the pre-cursor of the waveform Wb sum up at the time point t[k0+1], the intensity of the sample Sx[k0+1] will not decrease to zero. Under this circumstance, sample Sx[k0+1] originally representing the logic 0 symbol will be incorrectly determined to be logic 1 because of ISI. According to the discussions of FIG. 2 and FIG. 3, the influences of the pre-cursor and the post-cursor should be fully taken into consideration in order to compensate the channel characteristics and suppress ISI.

Generally, the decision feedback equalizer of the clock data recovering system can implement a decision feedback equalization mechanism to suppress influence of post-cursor from the received signal Sx and thus generate the superposed signal Sz. This equalization mechanism can be exemplified by FIG. 4. In response to a logic 1 symbol, the signal Sy exhibits a slowly rising and falling waveform, which reflects the logic 1 by a sample Sz[k] of the superposed signal Sz, but still includes a post-cursor of certain intensity. However, after the decision feedback equalization, the post-cursor of the received signal Sx can be annihilated by the feedback equalization signal. Consequently, the samples Sz[k] and Sz[k+1] corresponding to the post-cursor can approach zero to suppress ISI.

Figure 4:
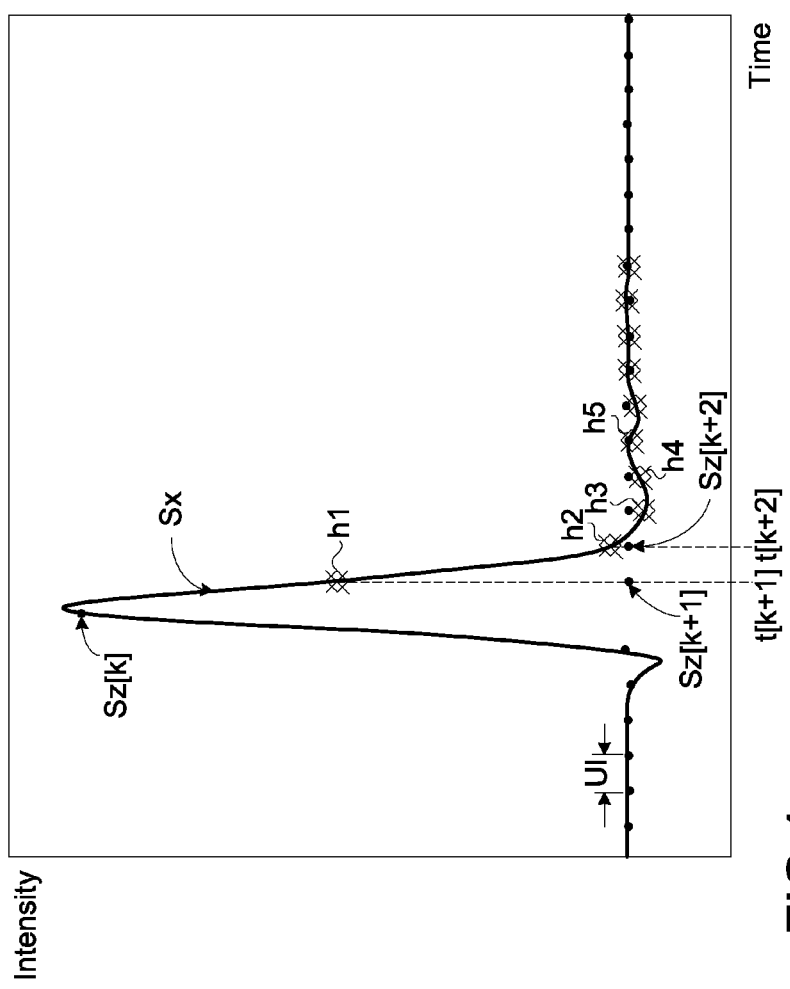
FIG. 4 schematically illustrates the equalization result by a decision feedback equalization mechanism.

For annihilating the post-cursor of the received signal Sx, the decision feedback equalizer has to generate the feedback equalization signal according to the change of a decision feedback equalizer coefficient set (also referred as a DFE coefficient set). The DFE coefficient set contains the coefficients h1, h2, h3, h4 and h5. As shown in FIG. 4, the coefficient h1 is greater than the coefficient h2 because the intensity of the superposed signal Sz at the time point t[k+1] is greater than that at the time point t[k+2].

Figure 5A:
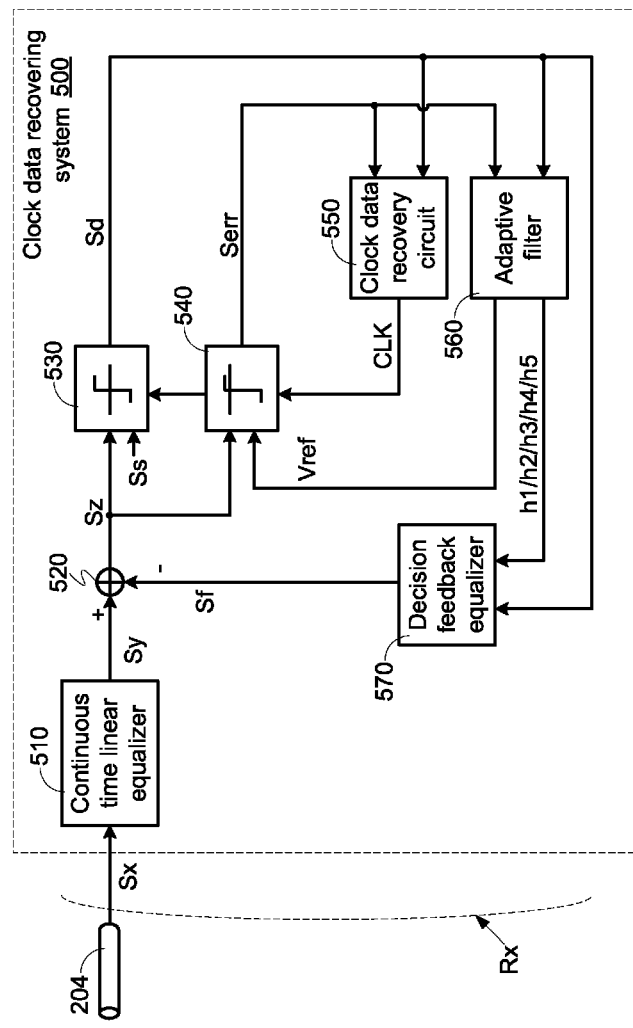
FIG. 5A is a schematic circuit diagram illustrating a clock data recovery system for a Serdes according to a first embodiment of the present invention.

FIG. 5A is a schematic circuit diagram illustrating a clock data recovery system for a Serdes according to a first embodiment of the present invention. As shown in FIG. 5A, the clock data recovery system 500 comprises a continuous time linear equalizer (CTLE) 510, a data slicer 530, an error slicer 540, a clock data recovery (CDR) circuit 550, a least mean square based adaptive filter 560, a decision feedback equalizer 570 and an adder 520.

As shown in FIG. 5A, the second end of the channel 204 is connected with the electrical circuit of the receiver Rx. Consequently, the received signal Sx is inputted into the continuous time linear equalizer 510 of the clock data recovery system 500. The continuous time linear equalizer 510 increases the magnitude of the high-frequency portion of the received signal Sx and thus generates a first equalized signal Sy. By the adder 520, a feedback equalization signal Sf from the decision feedback equalizer 570 and the first equalized signal Sy are superposed with each other to generate a superposed signal Sz.

The data slicer 530 is used for slicing the superposed signal Sz according to a clock signal CLK and a fixed slicing voltage Ss (e.g. 0V) and generating a data signal Sd. Moreover, the error slicer 540 is used for slicing the superposed signal Sz according to the clock signal CLK and a reference voltage Vref and generating an error signal Serr.

The clock data recovery circuit 550 receives the data signal Sd and the error signal Serr and thus generates the clock signal CLK to the data slicer 530 and the error slicer 540. Moreover, after the adaptive filter 560 receives the data signal Sd and the error signal Serr, the adaptive filter 560 generates the reference voltage Vref to the error slicer 540 and generates the DFE coefficient set (h1, h2, h3, h4, h5) to the decision feedback equalizer 570.

Moreover, the decision feedback equalizer 570 receives the data signal Sd and the DFE coefficient set (h1, h2, h3, h4, h5) and thus generates the feedback equalization signal Sf to the adder 520 in order for annihilating the post-cursor of the first equalized signal Sy. Moreover, the relationship between the superposed signal Sz, the feedback equalization signal Sf and the first equalized signal Sy may be expressed as:

$$Sz[k] = Sy[k] - \sum_{i=1}^{5} h_i \cdot Sd[k-i]$$

Generally, the clock data recovery system 500 of FIG. 5A samples the data and the phase error of the superposed signal Sz according to the same clock signal CLK. In this kind of clock data recovery system 500, the speed of generating the clock signal CLK by the clock data recovery circuit 550 is equal to the data rate. Consequently, the clock data recovery system 500 may be referred as a baud rate clock data recovering system. Moreover, the clock data recovery circuit 550 further comprises a Muler-Muler phase detector (not shown) for receiving the data signal Sd and the error signal Serr and generating a phase update information. According to the phase update information, the phase of the clock signal CLK is correspondingly adjusted.

Figure 5B:
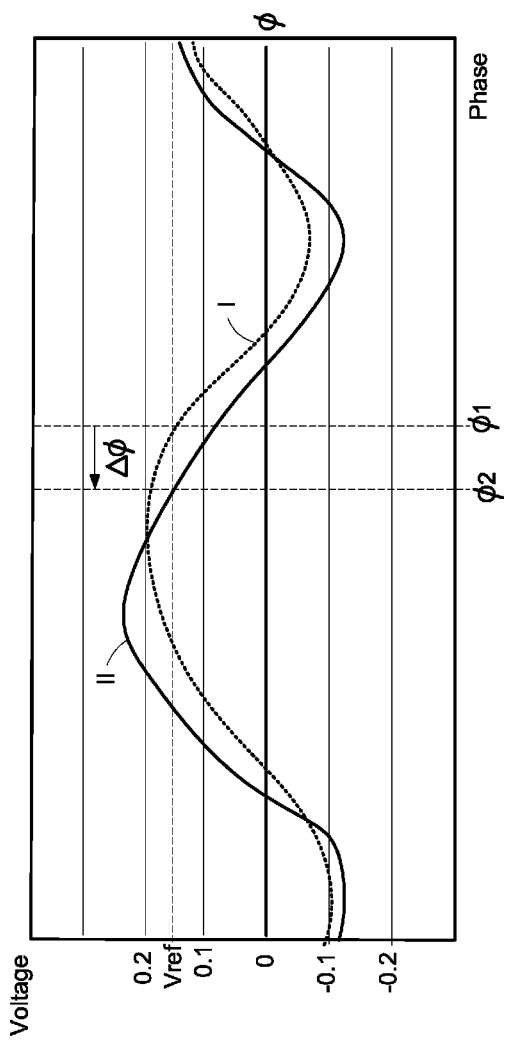
FIG. 5B schematically illustrates a coupling effect between the signals of the clock data recovery system according to the first embodiment of the present invention.

FIG. 5B schematically illustrates a coupling effect between the signals of the clock data recovery system according to the first embodiment of the present invention. In FIG. 5B, the dotted curve I denotes the superposed signal Sz before the feedback equalization signal Sf is inputted into the adder 520, and the solid curve II denotes the superposed signal Sz after the feedback equalization signal Sf is inputted into the adder 520.

Before the feedback equalization signal Sf is inputted into the adder 520, the relationship between the voltage and phase of the superposed signal Sz is expressed as the dotted curve I. Under this circumstance, the phase transition of the error signal Serr occurs at the phase Φ1, and the sampled phase of the clock signal CLK is locked at the phase Φ1. After the feedback equalization signal Sf is inputted into the adder 520, the relationship between the voltage and phase of the superposed signal Sz is expressed as the solid curve II. Under this circumstance, the phase transition of the error signal Serr occurs at the phase Φ2, and the sampled phase of the clock signal CLK is locked at the phase Φ2. Since there is a locked phase shift ΔΦ between the phase Φ1 and the phase Φ2, a coupling effect occurs between the first equalized signal Sy and the feedback equalization signal Sf. Moreover, since the phase of the clock signal CLK is influenced by the feedback equalization signal Sf, the system is unstable.

Figure 6A:
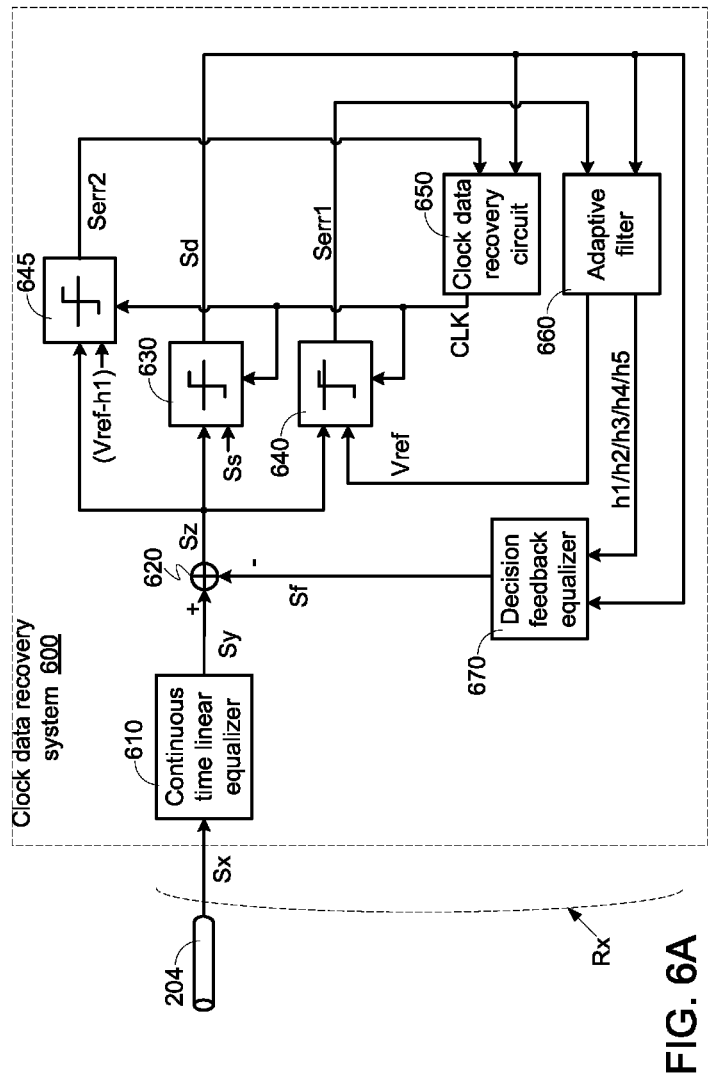
FIG. 6A is a schematic circuit diagram illustrating a clock data recovery system for a Serdes according to a second embodiment of the present invention.

FIG. 6A is a schematic circuit diagram illustrating a clock data recovery system for a Serdes according to a second embodiment of the present invention. As shown in FIG. 6A, the clock data recovery system 600 comprises a continuous time linear equalizer 610, a data slicer 630, a first error slicer 640, a second error slicer 645, a clock data recovery circuit 650, a least mean square based adaptive filter 660, a decision feedback equalizer 670 and an adder 620.

As shown in FIG. 6A, the second end of the channel 204 is connected with the electrical circuit of the receiver Rx. Consequently, the received signal Sx is inputted into the continuous time linear equalizer 610 of the clock data recovering system 600. The continuous time linear equalizer 610 increases the magnitude of the high-frequency portion of the received signal Sx and thus generates a first equalized signal Sy. By the adder 620, a feedback equalization signal Sf from the decision feedback equalizer 670 and the first equalized signal Sy are superposed with each other to generate a superposed signal Sz.

The data slicer 630 is used for slicing the superposed signal Sz according to a clock signal CLK and a fixed slicing voltage Ss (e.g. 0V) and generating a data signal Sd. Moreover, the first error slicer 640 is used for slicing the superposed signal Sz according to the clock signal CLK and a reference voltage Vref (or a first slicing voltage) and generating a first error signal Serr1. The second error slicer 645 is used for slicing the superposed signal Sz according to a clock signal CLK and a second slicing voltage and generating a second error signal Serr2. The second slicing voltage is obtained by subtracting the first decision feedback equalizer coefficient h1 from the reference voltage. That is, the second slicing voltage is equal to Vref–h1.

The clock data recovery circuit 650 receives the data signal Sd and the second error signal Serr2 and thus generates the clock signal CLK to the data slicer 630, the first error slicer 640 and the second error slicer 645. Moreover, after the adaptive filter 660 receives the data signal Sd and the first error signal Serr1, the adaptive filter 660 generates the reference voltage Vref to the first error slicer 640 and generates the DFE coefficient set (h1, h2, h3, h4, h5) to the decision feedback equalizer 670. Moreover, the second slicing voltage (=Vref–h1) is inputted into the second error slicer 645. In this embodiment, the reference voltage Vref and the DFE coefficient set (h1, h2, h3, h4, h5) are dynamically adjusted by the adaptive filter 660 according to the data signal Sd and the first error signal Serr1.

Moreover, the decision feedback equalizer 670 receives the data signal Sd and the DFE coefficient set (h1, h2, h3, h4, h5) and thus generates the feedback equalization signal Sf to the adder 620 in order for annihilating the post-cursor of the first equalized signal Sy. Moreover, the relationship between the superposed signal Sz, the feedback equalization signal Sf and the first equalized signal Sy may be expressed as:

$$Sz[k] = Sy[k] - \sum_{i=1}^{5} h_i \cdot Sd[k-i]$$

Similarly, the clock data recovering system 600 of FIG. 6A samples the data and the phase error of the superposed signal Sz according to the same clock signal CLK. In this kind of clock data recovering system 600, the speed of generating the clock signal CLK by the clock data recovery circuit 650 is equal to the data rate. Consequently, the clock data recovering system 600 may be also referred as the baud rate clock data recovering system. Moreover, the clock data recovery circuit 650 further comprises a Mueller-Muller phase detector (not shown) for receiving the data signal Sd and the second error signal Serr2 and generating a phase update information. According to the phase update information, the phase of the clock signal CLK is correspondingly adjusted.

Figure 6B:
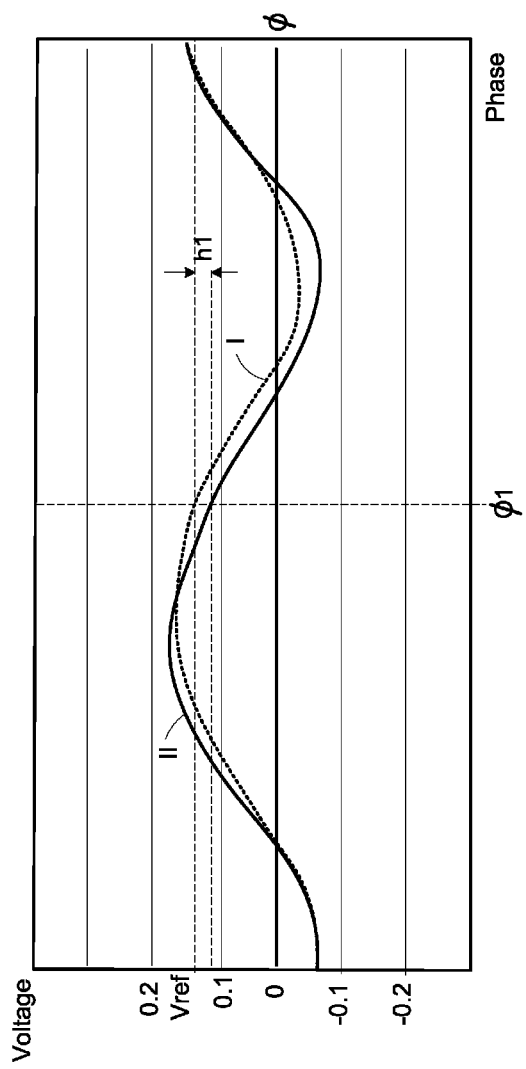
FIG. 6B schematically illustrates a decoupling effect between the signals of the clock data recovery system according to the second embodiment of the present invention.

FIG. 6B schematically illustrates a decoupling effect between the signals of the clock data recovery system according to the second embodiment of the present invention. In FIG. 6B, the dotted curve I denotes the superposed signal Sz before the feedback equalization signal Sf is inputted into the adder 620, and the solid curve II denotes the superposed signal Sz after the feedback equalization signal Sf is inputted into the adder 620.

Before the feedback equalization signal Sf is inputted into the adder 620, the relationship between the voltage and phase of the superposed signal Sz is expressed as the dotted curve I. Under this circumstance, the phase transition of the second error signal Serr2 occurs at the phase Φ1, and the sampled phase of the clock signal CLK is locked at the phase Φ1. After the feedback equalization signal Sf is inputted into the adder 620, the relationship between the voltage and phase of the superposed signal Sz is expressed as the solid curve II. Under this circumstance, the phase transition of the second error signal Serr2 also occurs at the phase Φ1, and the sampled phase of the clock signal CLK is locked at the phase Φ1. Since there is no locked phase shift ΔΦ, no coupling effect occurs between the first equalized signal Sy and the feedback equalization signal Sf. Moreover, since the phase of the clock signal CLK is not influenced by the feedback equalization signal Sf, the systematic stability is enhanced.

In comparison with the first embodiment, the clock data recovering system 600 of this embodiment further comprises the second error slicer 645 and provides the second slicing voltage (=Vref−h1) to the second error slicer 645. Since the phase of the clock signal CLK is not influenced by the feedback equalization signal Sf, the systematic stability is enhanced.

Optionally, the clock data recovering system 600 further comprises a variable gain amplifier (also referred to VGA, not shown). The variable gain amplifier is arranged between an input terminal of the clock data recovering system 600 and the continuous time linear equalizer 610. The variable gain amplifier is used for amplifying a channel signal from the channel 204 and generating the received signal Sx. Then, the received signal Sx is inputted into the continuous time linear equalizer 610.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A clock data recovery system, comprising:
   a continuous time linear equalizer receiving a received signal and generating a first equalized signal;
   an adder for superposing the first equalized signal and a feedback equalization signal with each other, thereby generating a superposed signal;
   a first error slicer for slicing the superposed signal according to a clock signal and a first slicing voltage, thereby generating a first error signal;
   a second error slicer for slicing the superposed signal according to the clock signal and a second slicing voltage, thereby generating a second error signal;
   a data slicer for slicing the superposed signal according to the clock signal and a third slicing voltage, thereby generating a data signal;
   a clock data recovery circuit receiving the data signal and the second error signal, and generating the clock signal to the data slicer, the first error slicer and the second error slicer;
   an adaptive filter receiving the data signal and the first error signal, and generating a reference voltage to the first error slicer and generating a decision feedback equalizer coefficient set, wherein the reference voltage is equal to the first slicing voltage; and
   a decision feedback equalizer receiving the data signal and the decision feedback equalizer coefficient set, and generating the feedback equalization signal to the adder.

2. The clock data recovery system as claimed in claim 1, wherein the decision feedback equalizer coefficient set contains a first decision feedback equalizer coefficient, wherein the second slicing voltage is obtained by subtracting the first decision feedback equalizer coefficient from the reference voltage.

3. The clock data recovery system as claimed in claim 1, wherein the continuous time linear equalizer is connected with a channel and receives the received signal from the channel.

4. The clock data recovery system as claimed in claim 1, further comprising a variable gain amplifier, wherein the variable gain amplifier is connected with a channel and receives a channel signal from the channel, wherein after the channel signal is amplified by the variable gain amplifier, the received signal is generated and inputted into the continuous time linear equalizer.

5. The clock data recovery system as claimed in claim 1, wherein the third slicing voltage is a fixed slicing voltage.

6. The clock data recovery system as claimed in claim 1, wherein the second slicing voltage is dynamically adjusted by the adaptive filter according to the data signal and the first error signal.

7. The clock data recovery system as claimed in claim 6, wherein the decision feedback equalizer coefficient set is dynamically adjusted by the adaptive filter according to the data signal and the first error signal.

8. The clock data recovery system as claimed in claim 1, wherein the clock data recovery circuit further comprises a Mueller-Muller phase detector, wherein the Mueller-Muller phase detector receives the data signal and the second error signal and generates a phase update information, wherein a phase of the clock signal is correspondingly adjusted according to the phase update information.

9. The clock data recovery system as claimed in claim 1, wherein the adaptive filter is a least mean square based adaptive filter.

* * * * *